United States Patent Office 3,274,091
Patented Sept. 20, 1966

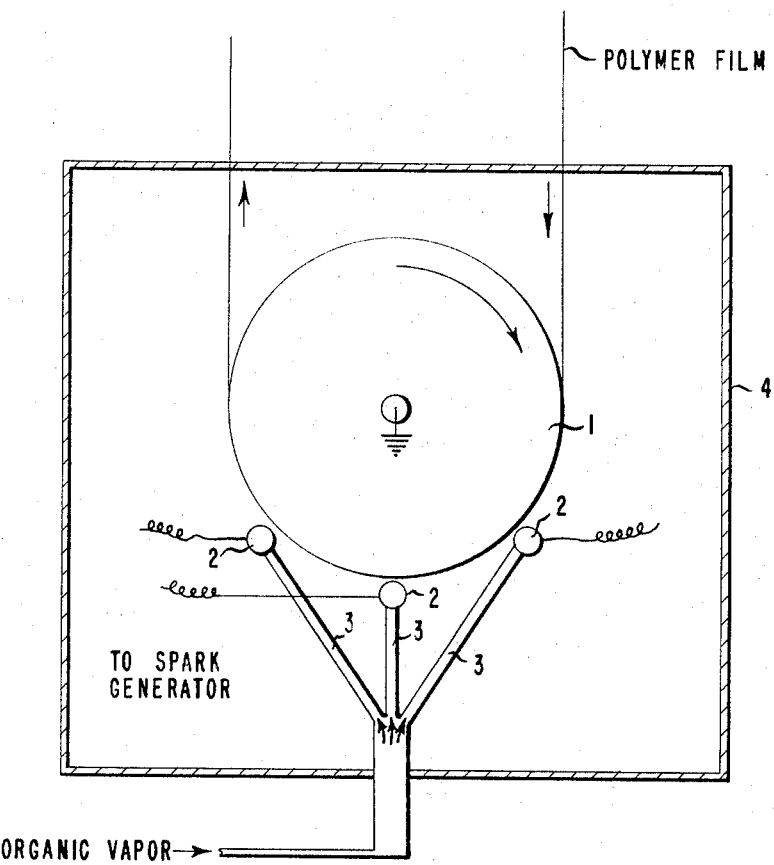

3,274,091
METHOD OF PRODUCING NON-FOGGING FILMS
Leonard Edward Amborski, Buffalo, N.Y., assignor to E. I. du Pont de Nemours and Company, Wilmington, Del., a corporation of Delaware
Filed Sept. 18, 1962, Ser. No. 224,399
6 Claims. (Cl. 204—165)

This invention is concerned with polymeric films and more particularly with the surface modification of certain polymeric films to inhibit the tendency of such films to collect moisture on their surfaces when in contact with atmospheres of high moisture content.

In the development of organic polymeric films for the wrapping of various articles a major effort has been directed toward providing films with low permeability to avoid moisture loss from the article or contamination of the article by undesired ambient vapors and with providing packages that are durable to avoid product loss during customer handling and the like. An attendant problem in the use of such films, especially for the wrapping of products of high moisture content, is the tendency of moisture within the package to condense as droplets or as a fog on the inside surface of the package which renders, as a result, the package unattractive and tends to obscure the view of the product being displayed, thus defeating, in large measure, the purpose for using a transparent wrapping material. In still other applications of films such as in solar stills, for example, it is important to the attainment of high efficiency that the distillate moisture vapor being condensed collect on the condensing surface of the still as a smooth layer and not as droplets.

It has been recognized for some time that if the surface of a film could be made more wettable the tendency of moisture vapor to collect as droplets would be minimized and moisture collected on the surface would be disposed essentially as a transparent continuous film. The various treatments such as flame, electrical discharge, or chemical treatments that have been employed for rendering the surface of various films such as polyolefin films printable have been observed to increase the wettability as measured by contact angle to a degree. However, the extent of increase of wettability for certain films especially those of polyethylene terephthalate, and of the various fluorine-containing hydrocarbon polymers, has not been sufficient to prevent a tendency toward fogging.

It is an object of this invention, therefore, to provide a convenient and commercially adaptable process for increasing the wettability of polymeric films, especially those difficult to wet. The foregoing and related objects wil more clearly appear hereinafter.

These objects are realized by the present invention which, briefly stated comprises subjecting the surface of a normally hydrophobic (i.e., water non-wettable), organic polymeric film to the action of an electrical discharge having an energy level below 15 electron volts, in a gaseous atmosphere consisting essentially of the vapor of an organic agent selected from the group consisting of acrylic acid and diethyl maleate, whereby to render said surface water wettable to a degree such that the contact angle for said surface is less than 15°.

A suitable arrangement of apparatus for carrying out the process of this invention is illustrated schematically in the accompanying drawing. Referring now, to the single figure of the drawing, a continuous self-supporting film of a particular polymer, e.g. a polymer selected from the group consisting of polyethylene terephthalate, polyvinyl fluoride, tetrafluoroethylene/hexafluoropropene copolymer, linear polyethylene and linear polypropylene, is passed continuously between a set of spaced electrodes consisting of rotating metal roll 1 which is connected electrically to ground and one or more stationary hollow metal tubes, 2 which are disposed parallel to the longitudinal axis of the roll and spaced a distance of from 0.005 to 0.25 inch from the surface thereof. The tubes constituting the positive electrode are each connected electrically to a suitable power source (for example, a high frequency spark generator) which supplies an alternating (or pulsating direct) current of the required intensity at the required voltage and frequency. A gaseous atmosphere consisting essentially of the vapor of the treating agent as the sole active agent and preferably admixed with a suitable carrier gas such as nitrogen is fed continuously to the hollow interior of the electrode tubes through distributor ducts 3 and issues from the tubes through suitable openings therein at the gap between each tube and the roll. The electrical discharge takes place in the atmosphere containing the vapors of the organic agent.

A carrying out the surface treatment of this invention, the potential difference between the electrodes may vary from very low voltages in the order of 100 volts up to pulsating volts of 100,000 and above. In general, it is preferred to maintain the voltage in excess of 2000 volts. Frequencies from 60 cycles per second up to 500,000 cycles per second and above can be used. Frequencies in the range of 300,000 to 500,000 cycles are preferred in order to obtain effective treatment at commercially acceptable exposure times. While the current to the electrodes may range up to 5.5 RF amperes or more, for optimum results a range from 0.3 RF amperes to 2.1 RF amperes is preferred. Power to the electrodes may range from 10 watts per lineal inch of the electrode length to 100 watts per lineal inch of electrode length. The electrical discharge employed herein has an energy level below 15 electron volts and is not to be confused with high or intermediate energy irradiations heretofore used in the treatment of polymeric surfaces.

The electrodes are preferably spaced from about 0.01 inch to about 0.125 inch. Useful results can be obtained when the electrode gap is as low as 0.005 inch to as much as 0.25 inch provided suitable adjustment is such features as amount of current, electrode dimension and exposure time are made.

While the surface treatment of this invention will substantially improve the water wettability of any organic polymeric film the surface of which is not readily wetted by water, i.e., organic polymer film surfaces on which water tends to gather in droplets on the surface of the film rather than form a continuous film thereover, it is particularly effective in enhancing the water-wettability (as indicated by reduction of the contact angle to a value below 15°) of the surfaces of organic polymeric hydrophobic films selected from the group consisting of films of polyethylene terephthalate, polyvinyl fluoride, tetrafluoroethylene/hexafluoropropene copolymer, linear polyethylene and linear polypropylene.

In order to realize the extremely low contact angles which characterize the treatment of this invention it is required that the gaseous atmosphere in which the electrical discharge takes place contain as the sole reactive agent a vapor of an organic agent selected from the group consisting of acrylic acid and diethyl maleate.

Time of exposure to the electric discharge treatment is not especially critical and effective treatments are realized at exposure times as short as $1 \times 10^{-5}$ second, and no adverse effects are noted at times as long as 60 seconds. Even longer exposure times can be employed although, for economic reasons, exposure times as short as possible consistent with effective treatment would normally be employed. Preferably the time of exposure of the polymeric surface to the electric discharge treatment should be at least $4 \times 10^{-4}$ second.

The following examples will serve to more fully illustrate the principles and practice of this invention.

EXAMPLE I

Polyethylene terephthalate film was passed at the rate of 2.2 feet per minute through a 0.026 of an inch gap formed by electrodes arranged as shown in the accompanying drawing. A continuous flow of a gaseous mixture consisting of nitrogen saturated with acrylic acid vapors was fed to the hollow tubes constituting the positive electrodes whereby to maintain an atmosphere in the gap consisting of acrylic acid vapors as the sole reactive agent. The hollow tubes were connected to a Lepel high frequency spark generator (Lepel High Frequency Laboratories, Inc.) and the metal roll was grounded. The current to the tube electrodes was between 1.3 and 1.7 RF amperes at a frequency of about 300,000 cycles. The resulting treated film surface has a contact angle of 3° whereas the untreated film surface had a contact angle of 65° and film subjected to the same electrical discharge in air had a contact angle of 32°. The treated and control films were placed over reservoirs of warm water. The water condensed on the treated surface to form a continuous film of water, and consequently the treated film remained clear and transparent, whereas the controls became fogged under the same treatment.

An additional sample of the polyethylene terephthalate film was treated in the same fashion, replacing the acrylic acid vapors with vapors of diethyl maleate. The contact angle of the resulting treated film surface measured 10°.

Determination of contact angle

Contact angle in this specification may be defined as $$\frac{\theta_a + \theta_r}{2}$$

where $\theta_a$ is the advancing contact angle and $\theta_r$ is the receding contact angle. The procedure is as follows: Handling the film only with tweezers, a one-half inch by one-inch sample is washed briefly in deionized water and then similarly in methyl ethyl ketone, followed by drawing in a circulating air oven for about ten minutes at 60° C. After exposing the sample to a radio-active static eliminator and brushing off any dust with a small camel's hair brush it is placed in the center of the specimen platform of the contact angle goniometer. The contact angle goniometer consists essentially of a microscope mounted with its axis horizontal, equipped with a mechanical stage (the specimen block) that can be raised and lowered or moved from side to side. The normal eye piece of the microscope is replaced with a protractor eye piece which is divided into degrees on a rotating scale with a vernier in minutes on a fixed arm. The cross-hairs in the eye piece divide the field of view into quadrants. A drop of deionized water is pushed onto the film surface from a capillary dropper mounted above the stage. The capillary dropper is made from an ordinary eye dropper by drawing the tip into a one-inch long capillary with a diameter just small enough to prevent water from running out of the tube under gravitational force only. To assist in dispersing liquid from the dropper the tip of the capillary is ground about 30° off the perpendicular. The protractor scale is then revolved until its cross-hair is parallel to the surface on which the drop is resting. The other cross-hair is adjusted until it is tangent to the drop at the point of contact with the surface on which it is resting. The angle between the cross-hairs inside the drop is read from the protractor scale. This is the advancing contact angle. Using the capillary dropper, water is subtracted from the drop on the film sample and the receding contact angle is recorded. For both advancing and receding contact angles the drop perimeter must move and to insure this the drop is viewed as water is being added or subtracted. Due to water evaporation, an advancing water drop will begin to recede within about 30 seconds after it has stopped advancing. Therefore, the advancing contact angle must be measured soon after the drop perimeter has stopped moving. A receding drop may take as much as 30 seconds to come to equilibrium after subtraction of water has stopped. Since water evaporation merely causes more water loss and does not affect the receding contact angle it is best to wait about 30 seconds before taking this reading.

EXAMPLE II

Following the procedure of Example I, samples of "Tedlar" polyvinyl fluoride film were subjected to an electrical discharge in an atmosphere consisting of nitrogen saturated with active organic vapor. Acrylic acid treated film exhibited a treated surface contact angle of 3°, and diethyl maleate, 6°. The untreated film had a contact angle of 71° and the contact angle of film treated with the electrical discharge in air was 40°.

EXAMPLE III

Following the procedure of Example I, samples of "Teflon" FEP tetrafluoroethylene/hexafluoropropylene copolymer film were subjected to the electrical discharge in an atomsphere consisting of nitrogen saturated with active organic vapor. Acrylic acid treated film exhibited a treated surface contact angle of 3°, and diethyl maleate treated film had a contact angle of 5°. Film treated only with the electrical discharge in air had a contact angle of 46°; and untreated film, a contact angle of 104°.

EXAMPLE IV

Samples of linear polyethylene film were subjected as in Example I to an electrical discharge in an atmosphere consisting of nitrogen saturated with active organic vapor. With acrylic acid, the contact angle of the treated film surface was 3°, and with diethyl maleate, 13°. The untreated control had a contact angle of 97°.

EXAMPLE V

Samples of linear polypropylene film were treated as in the previous examples. Film treated in an atmosphere containing diethyl maleate as the sole active agent exhibited a contact angle of 3°. The untreated film showed a contact angle of 95°.

It is obvious from the foregoing description and examples that the process of this invention provides a simple and commercially feasible operation which can be utilized for increasing the wettability of normally hydrophobic organic polymer film surfaces to the degree that essentially no fogging of surfaces of these polymeric films in contact with moist atmospheres would be encountered. The advantage of such a film for the wrapping of moist products is readily evident. In other applications such as in solar stills the use of film having wettable surfaces is of great importance to the efficient operation of these devices.

I claim:

1. A process for improving the water-wettability of the surface of a normally hydrophobic, organic polymeric film which comprises subjecting the surface of said film to the action of an electrical discharge having an energy level below 15 electron volts, in a gaseous atmosphere saturated with, as the sole active ingredient, the vapor of an organic agent selected from the group consisting of acrylic acid and diethyl maleate, whereby to render said surface water wettable to a degree such that the contact angle for said surface is less than 15°.

2. The process of claim 1 wherein the film is polyethylene terephthalate film.

3. The process of claim 1 wherein the film is polyvinyl fluoride film.

4. The process of claim 1 wherein the film is tetrafluoroethylene/hexafluoropropene copolymer film.

5. The process of claim 1 wherein the film is linear polyethylene film.

6. The process of claim 1 wherein the film is linear polypropylene film.

References Cited by the Examiner

UNITED STATES PATENTS 3,068,510 12/1962 Coleman _____ 204—165

FOREIGN PATENTS 845,897 8/1960 Great Britain.

JOHN H. MACK, *Primary Examiner.*

H. S. WILLIAMS, *Assistant Examiner.*